UNITED STATES PATENT OFFICE.

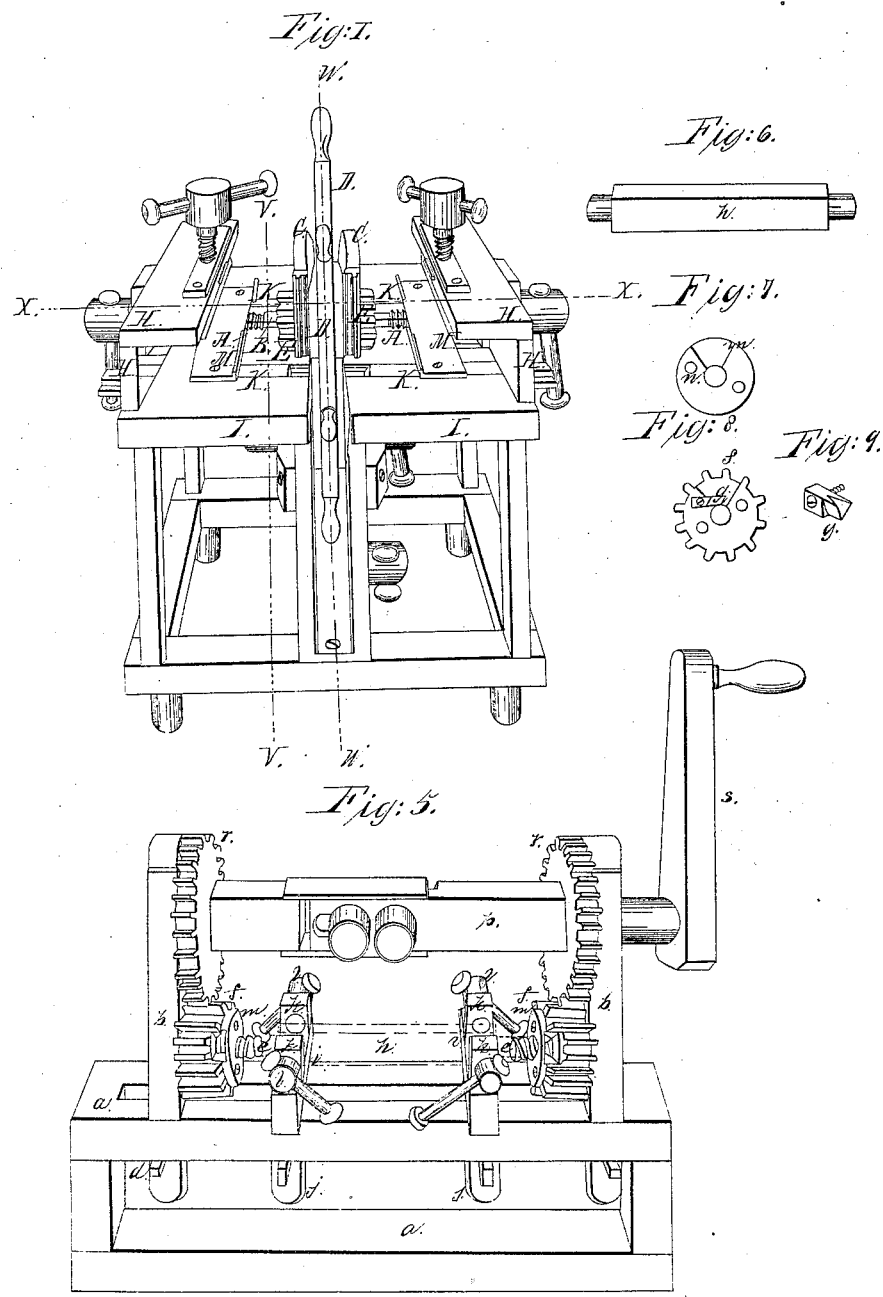

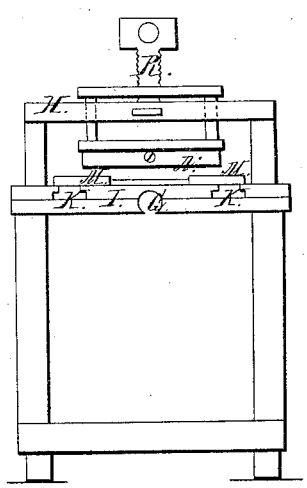
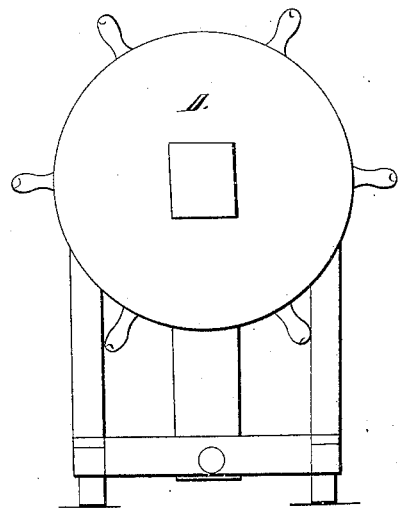
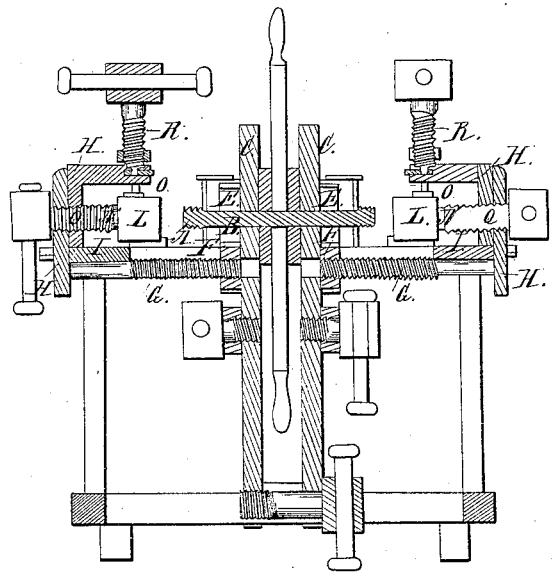

SAMUEL H. WILLS, OF ABINGDON, VIRGINIA.

IMPROVEMENT IN MACHINES FOR CUTTING SCREWS IN WOOD FOR FRAMING PURPOSES.

Specification forming part of Letters Patent No. 1,172, dated June 18, 1839.

*To all whom it may concern:*

Be it known that I, SAMUEL H. WILLS, of Abingdon, in the county of Washington and State of Virginia, have invented a new and useful Machine for Cutting Right and Left Male and Female Screws for Framing Purposes; and I do hereby declare that the following is a full and exact description thereof, reference being had to the annexed drawings of the same, making part of this specification.

Figure 1 is a perspective view of the machine for cutting female screws or nuts; Fig. 2, a vertical section of the same at the line $x\,x$ of Fig. 1; Fig. 3, a vertical section of the same at the line $v\,v$; Fig. 4, a vertical section of the same at the line $w\,w$; Fig. 5, a perspective view of the machine for cutting the male screws; Fig. 6, a rail on which screws are to be cut, which is to be placed in the position represented by dotted lines at $h$; Fig. 7, a plate or facing to be screwed on the face of the cutting-nut over the V-iron; Fig. 8, a cutting-nut and V-iron therein; Fig. 9, V or cutting iron.

My invention consists in machinery to cut right and left hand nuts or female screws instead of mortises, and also to cut corresponding male screws instead of tenons, so that in a single or a double framing a fine, close, and simple joint can at once be obtained in any situation.

My description of the machine is in the following words, referring to the accompanying drawings:

A, Figs. 1 and 2, are nut or female-screw cutters, made of steel or iron, to cut female screws or nut-mortises corresponding exactly in their grooves at their commencement and throughout. These cutters are inserted in the ends of a main shaft B, supported by and working through two upright standards C, between which standards is placed a wheel or whirl D, for turning said shaft and cutters.

E E are cog-wheels fixed outside the standards upon the main shaft and transmitting motion to cog-wheels. F F, Fig. 2, which last are held to the standard by the inner edge of the bench, and are female screws or nuts, (cut by the cutters aforesaid,) through which and the standards, respectively, pass one end of a screw G, which is at its other end firmly fixed in the frame H, (hereinafter described,) which supports the piece to be wrought, so that upon putting the machine in motion that frame, together with the said piece, is drawn by the last-named screw G toward the standards C and against the cutter B as fast as it is cutting to the required depth.

I is a steady bench outside of the standards aforesaid of convenient length and of a proper height to bring the piece to be wrought opposite the cutters before mentioned. This bench has two transverse parallel jutting grooves in its upper surface, from six to twelve inches apart, to receive two corresponding sliders K. These sliders rise a little above the surface of the bench, so that anything placed upon them will not rub it, and across them is laid the piece to be wrought by the cutters, which is marked L, Fig. 2, a smooth hole being previously made in it. This piece is kept in its place by the frame H, which adjusts itself to size and tightness in the following manner: Across and on the inner ends of the sliders toward the standard is screwed a thin piece of board M, two to four inches wide, on the inner edge of which rises a flange about one-fourth of an inch high, which fixes on that side the piece to be wrought, and which is adjusted so as to bring the face of the piece just up to the cutter. On the other end of the sliders (the length of which depends on the width of pieces to be wrought) is firmly fixed parallel to the flanged board a solid piece of wood H cut on the inside in the form of an inverted L. Under this L and upon the thin piece of board before mentioned is laid the piece to be wrought. On both the inside surfaces of the inverted L are pieces of thin board N O, fastened to the ends of two guiding-screws Q R, which pass freely to the outside of the L-piece, which boards are pushed by the screws Q R down upon and against the piece to be adjusted and held tight within.

It will be perceived that there are two sets of cutters, cog-wheels, and frames, one on each side of the standards, and carefully graduated so as to correspond exactly in their movements, and that the holes or nuts on each side are simultaneously cut to receive, respectively, a right-hand and left-hand screw.

The part of the machine for cutting the right and left male screws or tenons consists of a strong frame a, Fig. 5, of two parallel bars five inches square and three inches apart, supported at the ends, and of a convenient hight—say thirty inches—and of a length corresponding to the pieces upon which it may be necessary to cut tenons or screws. Between these bars are placed at each end a puppet-head b b, eighteen inches or more in height above the frame—one fixed, the other sliding backward or forward as the length of the piece to be wrought may require, but capable of being fastened at any point by a key underneath. (Seen at d.) In each of these puppet-heads, at convenient height to clear the bars, are strongly fixed two screws e e, (cut to correspond with the female screws or nuts made by the screw-cutters before described,) carefully adjusted exactly to correspond with each other in threads and protruding inside the puppet-heads to the length of six inches, or the thickness of the cog-wheel hereinafter described playing upon them. Upon these screws play backward and forward two nuts f, Figs. 7 and 8, respectively right and left, six inches or more thick, and of suitable diameter, whose peripheries are grooved so as to form cog-wheels. On the inner surface of these nuts, at the entrance of the holes, is fixed a V in the usual way, corresponding to their threads, (marked g, Figs. 5, 8, and 9,) which as the cog-wheel of each end is turned, and so screwed forward upon any piece prepared and opposite the holes, cut a right and left hand screw upon the ends of the pieces, respectively. This piece or rail h, Fig. 6, upon which the tenons to be cut have been previously prepared in size, is adjusted and held firmly in its place by two chairs i, Fig. 5, consisting of cross-pieces, from the middle of which descends a piece j, playing closely between the parallel bars and fixed to any place by keys underneath. From the ends of this cross-piece rise two other pieces k, eight or ten inches, having screws l passing through them from the outside and armed with pieces of thin board on their ends inside, by screwing up which the piece to be operated on can be adjusted and tightened at pleasure.

For the purpose of exactly adjusting the ends of the tenons to the V, there is screwed on the inner surface of the nuts and over the V a facing m, Figs. 5 and 7, of thin board having cut through it a smooth hole n, into which, when the end of the tenon is inserted, it properly addresses itself for the V and against the end of the screws c, which is its gage and determines its position when commencing cutting. The two V's must for work be adjusted with their points exactly on the same horizontal line with each other.

Through the fixed puppet-head and into the movable one passes a shaft p, which is coupled at its center at q for the purpose of extending or contracting, according to the length of the pieces to be wrought. On the ends of this shaft within the puppet-heads are two cog-wheels r r, Fig. 5, of suitable dimensions, which work into the circumference of the before-mentioned cog-nuts f and transmit motion to them. Upon the end of the shaft p which passes through the fixed puppet-head, and outside of the same, is a crank s, which gives motion to the wheels and screws the V cogs or cutters of both ends forward toward the center, and on the tenons corresponding to each other, and respectively fitting exactly the female screws or nut-mortises made by the part of the machinery before described. The coupling of the shaft is effected by halving one end of each shaft and then lapping said halved ends, through which are cut oblong mortises, into which are placed two screw-bolts on which are screwed nuts for drawing the parts of the shaft together and holding them securely in the position desired. The two flat pieces of board are fastened to the part of the coupled shaft on the left for the purpose of forming a box for the part of the shaft on the right to move in and to cause them to move and be held in a straight line.

The screws, puppet-heads, cog-wheels, L's, chairs, and frames may be made of wood or metal, and wooden and metal screws may be formed by applying to their proper places in the machine the cutters suited to either wood or metal, respectively.

What I claim as my invention, and desire to secure by Letters Patent, consists—

1. In the method of advancing the carriages, in which the posts or timber in which female screws or nuts are to be cut, simultaneously toward the cutters by means of the pinions E F, and screws G for cutting right and left screws, as before described.

2. The method of operating the revolving stocks or nuts f, in which the V-irons are fixed, for cutting right and left screws on the round tenons of rails of bedsteads simultaneously, as herein described.

3. The construction of the crank-shaft—that is to say, making it in two parts and coupling and screwing them together—in combination with the arrangement of the puppets b b, for the purpose of adapting the machine to different lengths of timber, in the manner herein described.

SAMUEL H. WILLS.

Witnesses:
F. J. WALLIS,
CHAS. J. CUMMINGS.